June 1, 1948.  W. A. HYLAND  2,442,727
SCRAPER FOR GRAIN DRILL DISKS
Filed Dec. 7, 1944
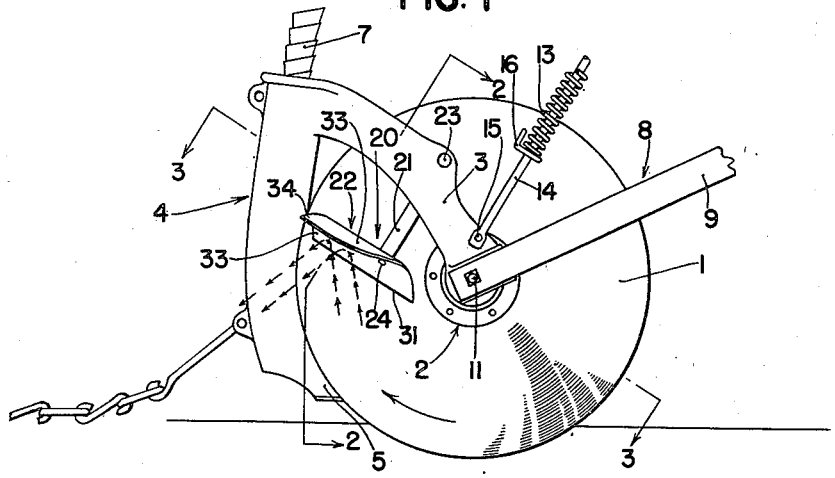
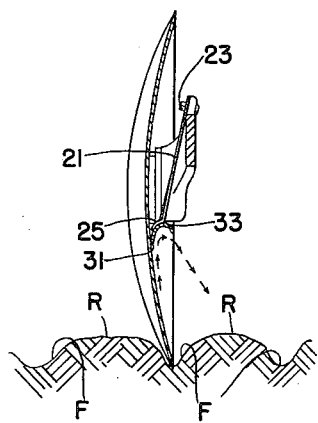
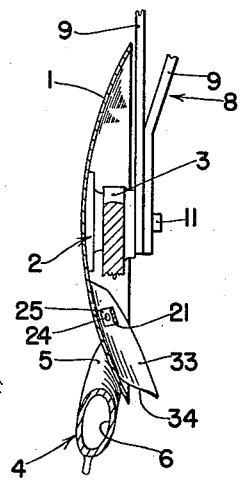
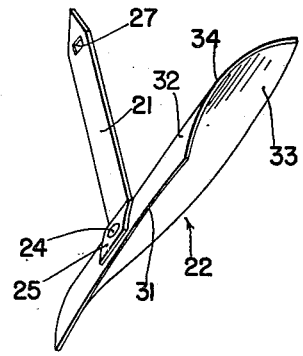
*INVENTOR.*
WILLIAM A. HYLAND
ATTORNEYS
WITNESS
E. B. Bjurstrom Patented June 1, 1948

2,442,727

UNITED STATES PATENT OFFICE 2,442,727

SCRAPER FOR GRAIN DRILL DISKS

William A. Hyland, Horicon, Wis., assignor to John Deere Van Brunt Company, a corporation of Wisconsin Application December 7, 1944, Serial No. 567,080

1 Claim. (Cl. 97—223)

The present invention relates generally to grain drills and more particularly to grain drills of the type having disk furrow openers.

The object and general nature of the present invention is to provide new and improved scrapers for the furrow openers of grain drills and their like, and more particularly, it is a feature of this invention to provide a scraper that is especially adapted for operation with the higher tractor speeds. Grain drills of the conventional type have a plurality of rather closely spaced furrow openers, each with a seed tube extending downwardly thereto from a common seed container. It is sometimes desirable or necessary to employ scrapers when using the disk type furrow openers, either a single disk furrow opener or a double disk furrow opener, the function of the scrapers being to clean the disks of adhering soil. Conventional scrapers are usually made in the form of a flat blade with a suitable connecting stem or supporting shank, and it has been found that when operating the grain drill at the higher speeds permissible when using the tractor, the flat blades tend to deflect the soil removed from the disk, sometimes directing the soil with sufficient force to cause it to plug up the seed boot of the adjacent furrow opener. One of the important features of the present invention is to provide a new and improved scraper which, irrespective of the speed of travel, not only removes the adhering soil from the associated disk but directs the loosened soil downwardly into the space between that furrow opener and the next adjacent furrow opener. In this way, there is no likelihood of soil removed by the scrapers interfering with the proper operation of the adjacent furrow openers.

Another important feature of the present invention is the provision of a new and improved scraper which deflects the soil removed from the disk in a generally downward and rearward direction away from the adjacent furrow opener. Further, it is a feature of this invention to provide a scraper of simple shape, such as, for example, cylindrical, so as to facilitate the manufacture of the scraper from flat stock with minimum shaping operations.

These and other objects and advantages of the present invention will be apparent to those skilled in the art after a consideration of the following detailed description of the preferred embodiment, taken in conjunction with the accompanying drawings.

In the drawings:

Figure 1 is a side view of the furrow opener of a grain drill in which is employed scraper means embodying the principles of the present invention.

Figures 2 and 3 are sectional views taken generally along the lines 2—2 and 3—3, respectively, of Figure 1.

Figure 4 is an enlarged perspective view of the scraper.

Referring first to Figure 1, the furrow opener shown comprises a dished or concave disk 1 connected by bearing means 2 to a supporting arm 3 formed, preferably but not necessarily integrally, with a seed boot 4. The latter is formed with an outlet end 5 that is adapted to lie behind the rear portion of the disk 1, the latter being normally disposed at an angle to the line of advance. The seed boot 4 is formed with a seed passage 6 therein and large enough at the upper end to receive loosely the lower end of a flexible tube 7 which is connected at its upper end (not shown) to the seed dispensing or distributing means of the drill. A drag bar 8, preferably including a pair of strap members 9 (Figure 3), is bolted, as at 11, to the forward end of the seed boot arm 3. Each drag arm 8 is connected at its upper end to the frame of the grain drill, the latter having suitable pressure arms fixed to a pressure shaft and connected to apply downward pressure through a compression spring 13 to the lower end of a rod member 14 that is pivotally connected, as at 15, to the seed boot arm 3. The rods 14 also serve as means whereby the furrow openers may be raised out of contact with the ground or forced into the ground by virtue of the pressure transmitted downwardly thereto by the compression springs 8. Each compression spring bears at its lower end against an adjustable abutment 16.

The scraper means with which the present invention is more particular concerned is indicated in its entirety by the reference numeral 20. The scraper 20 comprises a stem or shank 21 bolted, as at 23, to the seed boot arm 3. A scraper blade 22 is secured, as by a rivet 24 to the lower bent end 25 of the stem or shank 21, the latter being apertured, as at 27 (Figure 4), to receive the attaching bolt 23.

The scraper blade 22 is shaped so as to form a part of a cylindrical surface, whereby the shaping of the blade is materially expedited. The blade 22 includes a soil engaging and removing edge 31 and above the edge 31 the blade 22 curves upwardly and outwardly, as at 32, and finally the blade curves downwardly and rearwardly, as shown at 33. This latter section, as best shown in Figures 1 and 4, extends somewhat rearwardly, by virtue of the diagonal rear edge or end 34 of the blade 22. As thus shown in Figure 1, the blade 22 is set at such an angle that as the disk I rotates, in the direction of the arrow shown in the lower portion of Figure 1, adhering soil and the like is scraped from the disk I and, by virtue of the curvature and shape of the blade 22, is deflected rearwardly and downwardly, as indicated by the short arrows in Figures 1 and 2, so that the removed soil will be directed downwardly and rearwardly into the space between the adjacent furrows F (Figure 2). Thus, no matter how fast the grain drill may be driven, the soil will be deflected by the scraper 20 downwardly and rearwardly into the space between the furrows F and not over against the seed boot of the adjacent furrow opener and particularly not into the open upper end thereof into which the seed tube 7 normally extends.

According to the principles of the present invention, where the combination deflector scraper 20 deflects the soil removed from the disk rearwardly and laterally, depositing the soil in the space between adjacent furrows, appreciable ridges R are built up by the action of the scraper-deflector. This leaves the field ridged and serves the important purpose of conserving moisture and preventing soil blowing.

While I have shown and described above the preferred construction in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

A scraper for the disk of a grain drill furrow opener in which the disk is normally propelled forwardly and normally is disposed in a generally fore and aft extending vertical plane, said scraper comprising a generally semi-cylindrical curved member having a soil removing edge, adapted to lie against one side of said disk and remove soil therefrom, and a soil deflecting portion lying laterally outwardly of said edge and including a portion that is generally semi-circular in cross section and disposed with the convex intermediate section upwardly and presenting at the laterally outer side thereof a generally downwardly extending section disposed generally laterally outwardly of said edge and lying in a position only a short distance above the level of said soil removing edge and a materially greater distance below the level of the upper convex part of the scraper, so as to deflect soil removed from the disk substantially directly downwardly toward the ground.

WILLIAM A. HYLAND.

REFERENCES CITED

The following references are of record in the file of this patent:

UNITED STATES PATENTS

| Number | Name | Date |
|---|---|---|
| 659,881 | Van Brunt | Oct. 16, 1900 |
| 715,257 | Gillham | Dec. 9, 1902 |
| 921,357 | Brown | May 11, 1909 |
| 1,104,569 | Stephens | July 21, 1914 |
| 1,147,662 | Wachter | July 20, 1915 |